United States Patent
Ziegler et al.

(10) Patent No.: US 9,405,655 B2
(45) Date of Patent: Aug. 2, 2016

(54) SYSTEM AND METHOD FOR RUNNING A VALIDATION PROCESS FOR AN INFORMATION HANDLING SYSTEM DURING A FACTORY PROCESS

(71) Applicant: Dell Products, LP, Round Rock, TX (US)

(72) Inventors: Jeremy R. Ziegler, Pflugerville, TX (US); Erika Talbott, Cedar Park, TX (US)

(73) Assignee: Dell Products, LP, Round Rock ( * ) Notice: Subject to any disclaimer, the term of this patent is extended or adjusted under 35 U.S.C. 154(b) by 107 days.

(21) Appl. No.: 14/219,308

(22) Filed: Mar. 19, 2014

(65) Prior Publication Data

US 2015/0269055 A1 Sep. 24, 2015

(51) Int. Cl.
- *G06F 9/44* (2006.01)
- *G06F 11/00* (2006.01)
- *G06F 11/36* (2006.01)

(52) U.S. Cl.
CPC .................................. *G06F 11/3604* (2013.01)

(58) Field of Classification Search
None
See application file for complete search history.

(56) References Cited

U.S. PATENT DOCUMENTS

| | | | |
|---|---|---|---|
| 6,732,053 B1 * | 5/2004 | Aragona | G01R 31/2834 702/108 |
| 7,912,993 B2 | 3/2011 | Ziegler | |
| 8,090,937 B2 | 1/2012 | Beelitz et al. | |
| 8,856,748 B1 * | 10/2014 | Larsen | G06F 11/3668 717/125 |
| 2002/0083083 A1 | 6/2002 | Smith et al. | |
| 2003/0084074 A1 * | 5/2003 | Balogh | G06F 9/505 |
| 2004/0128651 A1 * | 7/2004 | Lau | G06F 11/3664 717/124 |
| 2008/0133934 A1 * | 6/2008 | Gopinath | G06F 11/3672 713/189 |
| 2008/0163015 A1 * | 7/2008 | Kagan | G06F 11/2294 714/724 |
| 2015/0046231 A1 * | 2/2015 | Sunder | G06Q 10/06395 705/7.41 |
| 2015/0046389 A1 * | 2/2015 | Dhayapule | G06F 17/30563 707/602 |

* cited by examiner

*Primary Examiner* — Insun Kang
(74) *Attorney, Agent, or Firm* — Larson Newman, LLP (57) ABSTRACT

An information handling system includes a memory and a processor. The memory to store a script and an exemption list for a validation process, and the script and the exemption list are received from a server. The processor is in communication with the memory, and configured to send a validation process pass indicator in response to a validation process error file being empty; in response to the validation process error file not being empty: to read a line of the validation process error file, to determine whether an error on the line of the validation process error file is found in an exemption list, and to add the error to an error log in response the error not being found in the exemption list; and to send the validation process pass indication in response to the error log being empty, otherwise sending a validation process fail indication.

16 Claims, 4 Drawing Sheets

SYSTEM AND METHOD FOR RUNNING A VALIDATION PROCESS FOR AN INFORMATION HANDLING SYSTEM DURING A FACTORY PROCESS

FIELD OF THE DISCLOSURE

The present disclosure generally relates to running validation process for an information handling system during a factory process.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

During a manufacturing/factory process of an information handling system, different drivers/software are installed for hardware components of the information handling system. Checks can be performed to ensure that the drivers/software are compliant with requirements made by the manufacturer.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
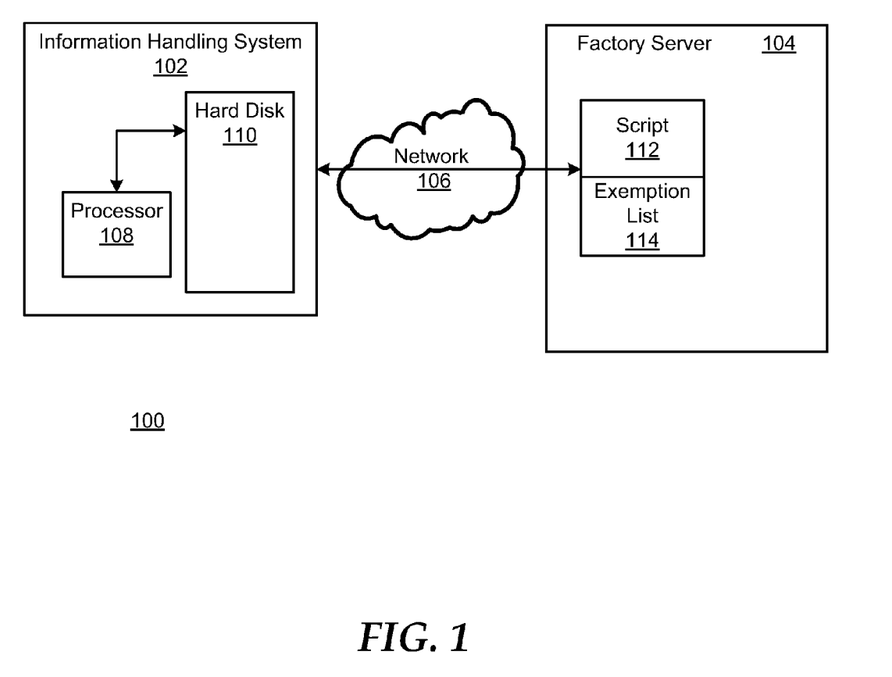
FIG. 1 is a block diagram of a system during a factory process for an information handling system.

FIG. 1 shows a system 100 during a factory process for an information handling system 102. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is an illustration of a system 100 including an information handling system 102 and a factory server 104. The information handling system 102 is in communication with the factory server 104 via a network 106. The factory server 104 includes stored thereon a script 112 to be executed during a validation process for applications and drivers to be preinstalled on build-to-order ("BTO") computer systems, represented in FIG. 1 by a information handling system 102. The information handling system 102 includes a processor 108 and a hard disk driver 100. The factory server 104 also includes an exemption list 114 to be utilized during the validation process. The factory server 104 can also include factory installation packages, which can be utilized by the information handling system 102 to installation hardware and associated drivers during a factory-installation stage of the manufacturing process. In different embodiments, the script 112, the exemption list 114, and the factory installation packages can be stored in a common memory or separates memories of the factory server 104.

During the factory-installation stage, responsive to a command from the information handling system 102 to the factory server 104 to download one of the factory installation packages, the factory-install package is downloaded from the server to the information handling system onto which the application or driver is to be preinstalled.

In particular, a "PARTS" file for the information handling system 102 includes a list of part numbers corresponding to selected installation packages for applications and drivers to be installed thereon. The selected packages are downloaded over the network 106 to the hard disk 110, and the applications and drivers installed on the information handling system 102 in the order in which they are listed in the PARTS file.

Also, during the factory-installation, the processor 108 can perform a validation check on the installed drivers, via scripting engine of the processor executing the script 112 as described below. In an embodiment, the validation check/process can be a CHKLOGO tool that can be executed using a scripting language, such as Python or the like, in an operating system, such as WinPE or the like, of the processor 108.

During the factory-installation, the factory server 104 can configure the script 114 for the validation process. While configuring the script 114, the factory server 104 can determine whether any skip conditions exist for the validation process. In an embodiment, the skip conditions can be different conditions that are based on a development level of the information handling system, based on bypass flags, or on the line of business for the information handling system. For example, the development level of an information handling system can be that the information handling system is at the prototype level, such that the validation process should be skipped because the low level of production for the information handling system 102 can cause the validation process to fail for the information handling system.

In an embodiment the bypass flag can be associated with a part installed in the information handling system 102. For example, a particular part/component can be identified as a component not to test because the part has test signed drivers assign to it at this developmental phase of the information handling system 102, and the test signed drivers can cause the validation process to fail. However, these signed test drivers can be replaced with properly authenticated drivers later in the factory process, and then a different check process can be used to verify the drivers. In an embodiment, the line of business skip condition can be associated with a particular product line that does not need to comply with specific standards. For example, the manufacturer may have multiple product lines and one or more of the lines may not be required to have specific drivers/software for components in the information handling system 102 based on an agreement with the manufacturer of the component and/or driver/software.

If the factory server 104 determines skip conditions for the validation process, the factory server 104 may not provide the script 112 to the information handling system, such that the validation process cannot be performed by the processor 108. However, if factory server 104 determines that no skip conditions exist, the factory server can send the validation process script 112, the exemption list 114, data files, and tools to the information handling system 102 to be stored in the hard disk 110. When the script 112 and exemption list 114 are stored in the hard disk 110, the scripting engine of the processor 108 may make a few more modifications to the script 112. In particular, the processor 108 can determine whether non-fail conditions exist for the drivers installed on the information handling system 102. In an embodiment, the non-fail conditions can be similar to this skip conditions, such as development level conditions. Non-fail conditions can also include instructions to run the validation process, but any fail conditions that are detected are ignored (run but do not fail conditions). In an embodiment, the run but do not fail conditions can be specific conditions that can cause the validation process to be executed and failures to be logged without ending the validation process for that particular machine. For example, without these non-fail conditions, any detected error will result in a notification that the information handling system has failed and needs to be re-tested and reconfigured. However, if the detected error matches one of the run but do not fail conditions, the failure notification will not be provided to a user.

If any non-fail conditions exist, the processor 108 can modify the script 112 to include the non-failure conditions. The processor 108 can then insert a command to cause the validation process to be executed when the operating system of the information handling system is online.

When the scripting engine of the processor 108 begins executing the validation process, a model number of the information handling system 102. The processor 108 then retrieves the exemption list from the hard disk 110. In an embodiment, the exemptions can include items that will be checked by other processes later in the main factory process, driver manufacture exemptions, test signed drivers, and the like. The driver manufacture exemptions can be for components that a manufacturer has indicated that the component or components can be installed in the information handling system 102 without the associated driver being checked. In an embodiment, the test signed drivers are drivers that are signed (authenticated) early in the factory process to so that the drivers appear authenticated to the operating system of the information handling system but that would cause a failure during the validation process. These signed test drivers can be exempt from creating an error because they will be corrected at the end of the factory process.

A validation process error file is created during the execution of the validation process. The processor 108 can determine whether the validation process error file is empty. If the error file is empty, the processor 108 sends a validation process pass indication, and ends the validation process. In an embodiment, the validation process pass indication can be a visual indicator to a user, such as lighting a screen a particular color. However, if the error file is not empty, the processor 108 reads a line of the error file and determines whether the error and the associated model number found in the line of the error file match an entry in the exemption list 114. If the error and model number are not found in the exemption list, the processor 108 adds the error to an error log.

However, if the error and model number are found in the exemption list, the processor determines whether the error is handled at another portion of the factory process. If not, the processor 108 adds the error to an error log. The processor 108 then continues these operations until the processor has evaluated every line of the error file. The processor 108 then determines whether the error log is empty. If the error file is empty, the processor 108 sends the validation process pass indication. However, if the validation error log is not empty, the processor sends a validation process fail indication. In an embodiment, the validation process fail indication can be a visual indicator to a user, such as lighting a screen a particular color that is different from the color of the validation process pass indication.

Figure 2:
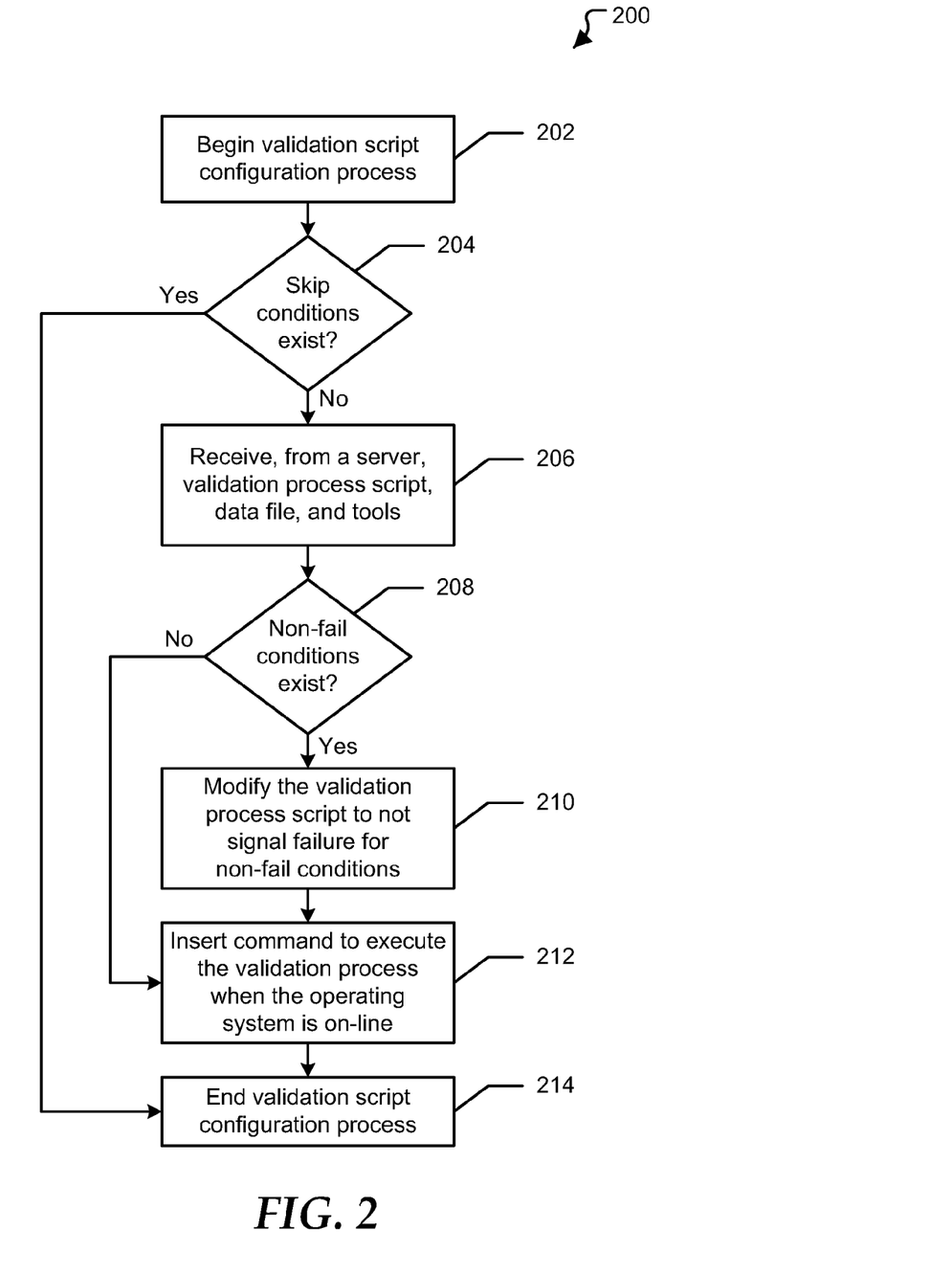
FIG. 2 is a flow diagram of a method for generating a script portion of a validation process.

FIG. 2 shows a method of a flow diagram of a method 200 for generating a script portion of a validation process. At block 202, a validation script configuration process begins. In an embodiment, the validation script configuration process can be used in a validation process, which can be a tool to verify that different components/hardware installed within information handling system during a manufacturing process have proper drivers/software installed that are compliant with standards set by the manufacturers of the drivers/software. A determination is made whether any skip conditions exist for the validation process at block 204. In an embodiment, the skip conditions can be different conditions that are based on a development level of the information handling system, based on bypass flags, or on the line of business for the information handling system. The development level of an information handling system can be that the information handling system is at the prototype level, which can be the lowest level of production. In an embodiment the bypass flag can be associated with a part installed in the information handling system. For example, a particular part/component can be identified as a component not to test because the part has test signed drivers assign to it at this developmental phase, and the test signed drivers can cause the validation process to fail. However, these signed test drivers can be replaced with properly authenticated drivers later in the factory process, and then a different check process can be used to verify the drivers at that time. In an embodiment, the line of business skip condition can be associated with a particular product line that does not need to comply with specific standards. For example, the manufacturer may have multiple product lines and one or more of the lines may not be required to have specific drivers/software for components in the information handling system based on an agreement with the manufacturer of the component and/or driver/software.

If no skip conditions exist, validation process script, data files, and tools are received from the server at block 206, otherwise the validation script configuration process ends at block 214. At block 208, a determination is made whether non-fail conditions exist. In an embodiment, the non-fail conditions can be similar to this skip conditions, such as development level conditions. Non-fail conditions can also include instructions to run the validation process, but any fail conditions that are detected are ignored (run but do not fail conditions). In an embodiment, the run but do not fail conditions can be specific conditions that can cause the validation process to be executed and log failures without ending the validation process for that particular machine. For example, without these non-fail conditions, any detected error will result in a notification that the information handling system has failed and needs to be re-tested and reconfigured. However, the run but do not fail conditions can prevent the failure notification from being provided to a user.

If any non-fail conditions exist, the validation process script is modified to include the non-failure conditions at block 210. At block 212, a command to execute the validation process when the operating system of the information handling system is online is inserted into the validation process, and the validation script configuration process is ended at block 214.

Figure 3:
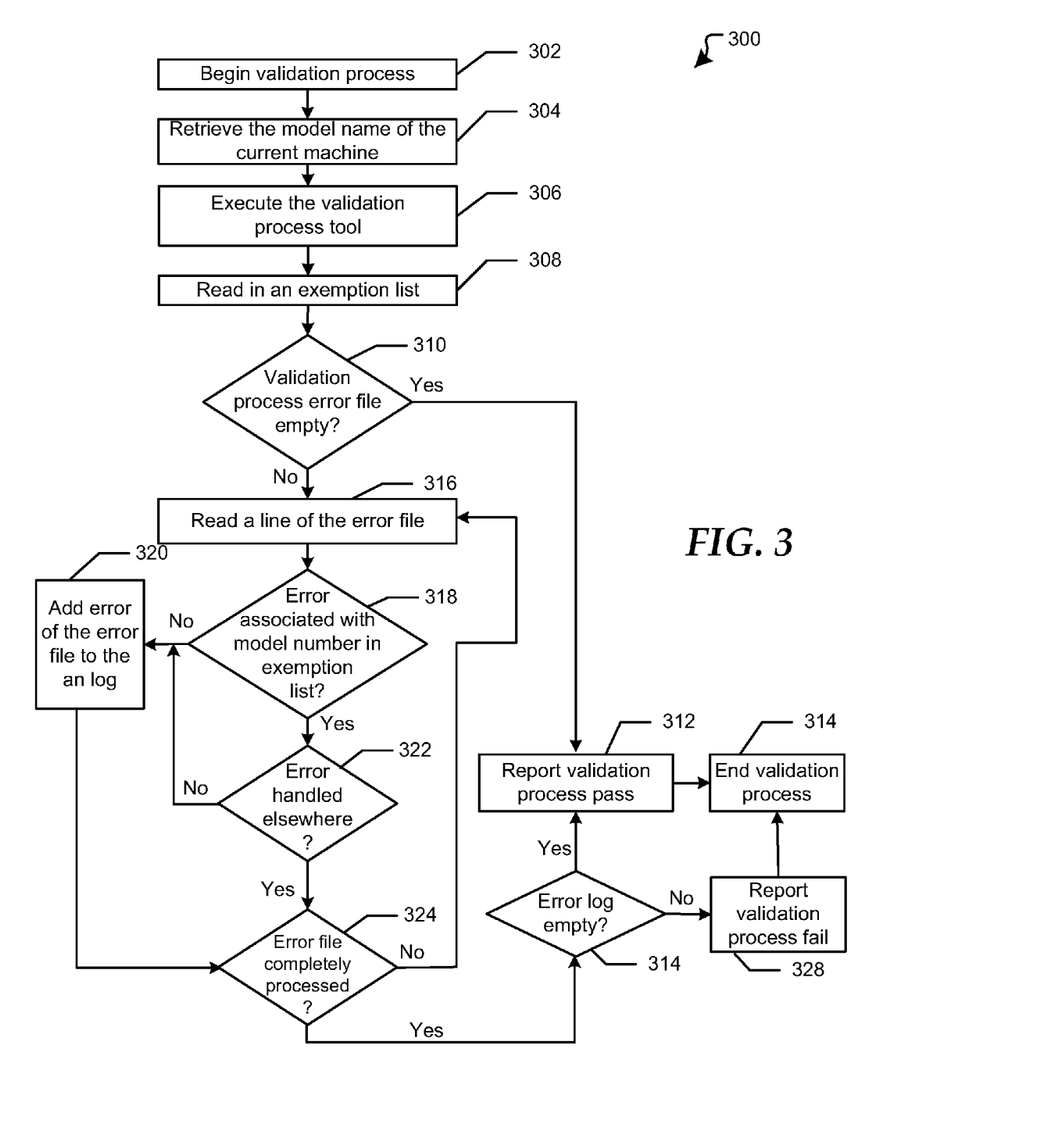
FIG. 3 is a flow diagram of a method for executing a validation process during a factory process of the information handling system.

FIG. 3 shows a flow diagram of a method 300 for executing a validation process during a factory process of the information handling system. At block 302, the validation process is begun. A model number of the current information handling system is retrieved at block 304. In an embodiment, the model name can be provided in a standard format to be accessed by the validation process. At block 306, the validation process tool is executed. An exemption list is retrieved at block 308. In an embodiment, the exemption list can be retrieved from a server within the factory process for the information handling system, and the exemptions can be errors that will not cause the validation process for the current information handling system to fail. In an embodiment, the exemptions can include items that will be checked by other processes later in the main factory process, driver manufacture exemptions, test signed drivers, and the like. The driver manufacture exemptions can be for components that a manufacturer has indicated that the component or components can be put in the information handling system without the associated driver being checked. In an embodiment, the test signed drivers are drivers that are signed (authenticated) early in the factory process to so that the drivers appear authenticated to the operating system of the information handling system but that would cause a failure during the validation process. These signed test drivers can be exempt from creating an error because they will be corrected at the end of the factory process.

A determination of whether the validation process error file is empty is made at block 310. If the error file is empty, a validation process pass is reported at block 312, and the validation process ends at block 314. However, if the error file is not empty, a line of the error file is read at block 316. At block 318, a determination is made whether the error and the associated model number match an entry in the exemption list. If the error and model number are not found in the exemption list, the error is added to an error log at block 320.

At block 322, a determination is made whether the error is handled at another portion of the factory process. If the error is not handled at another part of the factory process, the flow continues at block 320 as described above. However, if the error is handled at another part of the factory process, a determination is made whether the error file is completely processed at block 324.

If the error file is not completely processed, the flow continues as stated above at block 316. If the error file is completely processed, a determination is made whether the error log is empty at block 326. If the error file is empty, a validation pass indication is reported at block 312, and the validation process and at block 314. However, if the validation error log is not empty, the validation process fail indication is reported at block 328, and the validation process ends at block 314.

Figure 4:
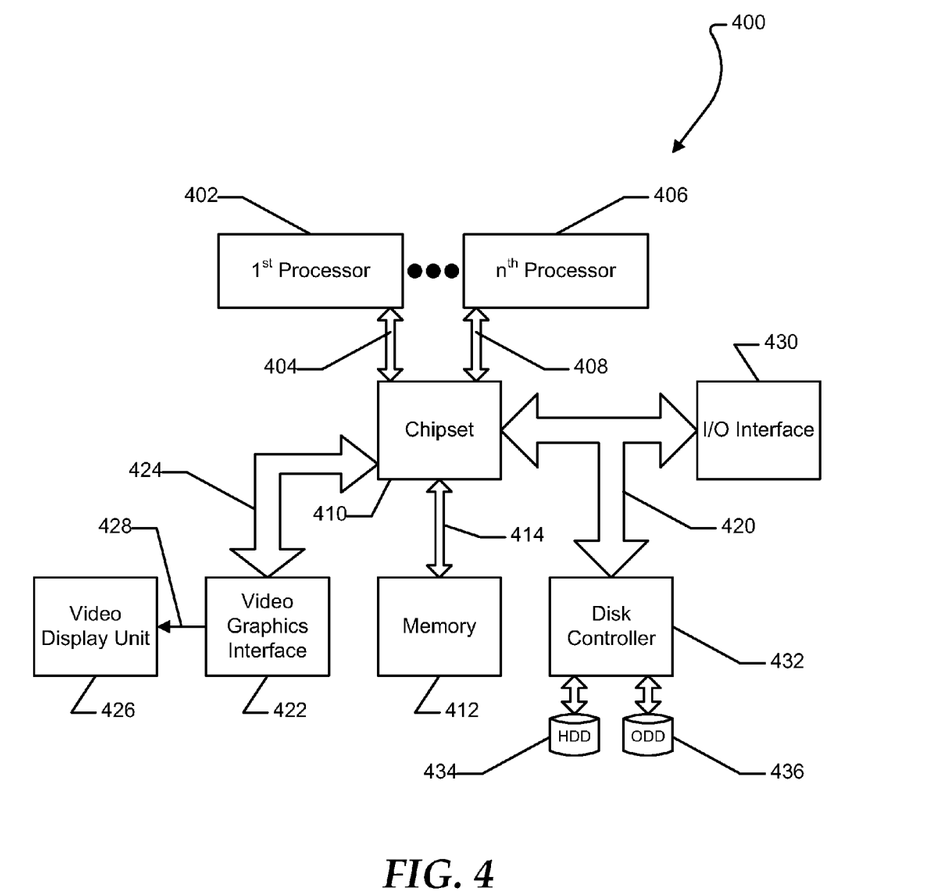
FIG. 4 is a block diagram illustrating an information handling system according, to an embodiment of the present disclosure.

FIG. 4 shows an information handling system 400 capable of administering each of the specific embodiments of the present disclosure. The information handling system 400 can represent the information handling system 102, the server 104, or other system located anywhere within network 100 of FIG. 1, including the remote data center or cloud 180 operating the virtual machine applications described herein. The information handling system 400 may include a processor 402 such as a central processing unit (CPU), a graphics processing unit (GPU), or both. Moreover, the information handling system 400 can include a main memory 404 and a static memory 407 that can communicate with each other via a bus 408. The information handling system 400 includes near-field communications (NFC) device and interface 418, such as an antenna and NFC subsystem. The information handling system 400 can also include a disk drive unit 416, and a network interface device 420. As shown, the information handling system 400 may further include a video display unit 410, such as a liquid crystal display (LCD), an organic light emitting diode (OLED), a flat panel display, a solid state display, or a cathode ray tube (CRT). The video display unit 410 may also act as an input accepting touchscreen inputs. Additionally, the information handling system 400 may include an input device 412, such as a keyboard, or a cursor control device, such as a mouse or touch pad. Information handling system may include a battery system 414. The information handling system 400 can represent a device capable of telecommunications and whose can be share resources, voice communications, and data communications among multiple devices. The information handling system 400 can also represent a server device whose resources can be shared by multiple client devices, or it can represent an individual client device, such as a laptop or tablet personal computer.

The information handling system 400 can include a set of instructions that can be executed to cause the computer system to perform any one or more of the methods or computer based functions disclosed herein. The computer system 400 may operate as a standalone device or may be connected such as using a network, to other computer systems or peripheral devices.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single information handling system 400 is illustrated, the term "system" shall also be taken to include any collection of systems or subsystems that individually or jointly execute a set, or multiple sets, of instructions to perform one or more computer functions.

The disk drive unit 416 or static memory 414 may include a computer-readable medium 422 in which one or more sets of instructions 424 such as software can be embedded. The disk drive unit 416 or static memory 414 also contains space for data storage. Further, the instructions 424 may embody one or more of the methods or logic as described herein. In a particular embodiment, the instructions 424 may reside completely, or at least partially, within the main memory 404, the static memory 406, and/or within the processor 402 during execution by the information handling system 400. The main memory 404 and the processor 402 also may include computer-readable media. The network interface device 420 can provide connectivity to a network 426, e.g., a wide area network (WAN), a local area network (LAN), wireless network (IEEE 802), or other network. The network interface 420 may also interface with macrocellular networks including wireless telecommunications networks such as those characterized as 2G, 3G, or 4G or similar wireless telecommunications networks similar to those described above. The network interface 420 may be a wireless adapter having antenna systems 432 for various wireless connectivity and radio frequency subsystems 430 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal; so that a device connected to a network 428 can communicate voice, video or data over the network 428. Further, the instructions 424 may be transmitted or received over the network 428 via the network interface device 420. In a particular embodiment, BIOS/FW code 424 reside in memory 404, and include machine-executable code that is executed by processor 402 to perform various functions of information handling system 400.

Information handling system 400 includes one or more application programs 424, and Basic Input/Output System and Firmware (BIOS/FW) code 424. BIOS/FW code 424 functions to initialize information handling system 400 on power up, to launch an operating system, and to manage input and output interactions between the operating system and the other elements of information handling system 400.

In another embodiment (not illustrated), application programs and BIOS/FW code reside in another storage medium of information handling system 400. For example, application programs and BIOS/FW code can reside in drive 416, in a ROM (not illustrated) associated with information handling system 400, in an option-ROM (not illustrated) associated with various devices of information handling system 400, in storage system 407, in a storage system (not illustrated) associated with network channel 420, in another storage medium of information handling system 400, or a combination thereof. Application programs 424 and BIOS/FW code 424 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store a script and an exemption list for a validation process during a manufacturing process of the information handling system, wherein the script and the exemption list are received from a server; and
   a hardware processor in communication with the memory, the processor configured to send a validation process pass indication in response to a validation process error file being empty; in response to the validation process error file not being empty: to read a line of the validation process error file, to determine whether an error on the line of the validation process error file and a model number of the information handling system are found in an exemption list, and to add the error to an error log in response the error not being found in the exemption list, to determine whether the error is handled in another portion of the manufacturing process of the information handling system, in response to the error not being handled in another portion of the manufacturing process, to add the error to the error log, in response to the error being handled in another portion of the manufacturing process, to determine whether the error file is completely processed, in response to the error file being completely processed, to determine whether the error log is empty, and to send the validation process pass indication in response to the error log being empty, otherwise to send a validation process fail indication.

2. The information handling system of claim 1, wherein the validation process error file is created during an execution of the validation process.

3. The information handling system of claim 1, wherein the processor further to retrieve a model name of the information handling system, and to read the exemption list prior to determining whether the validation process error file is empty.

4. The information handling system of claim 1, wherein the validation process pass indication is sent when a screen is a first color.

5. The information handling system of claim 4, wherein the validation process fail indication is sent when the screen is lit a second color different than the first color.

6. A method comprising:
   determining, by a processor, whether a validation process error file is empty;
   in response to the validation process error file being empty, sending, by the processor, a validation process pass indication;
   in response to the validation process error file not being empty:
   reading, by the processor, a line of the validation process error file;
   determining, by the processor, whether an error on the line of the validation process error file and a model number of an information handling system are found in an exemption list for a validation process during a manufacturing process of the information handling system;
   in response the error and the model number not being found in the exemption list,
   adding, by the processor, the error to an error log;
   otherwise determining, by the processor, whether the error is handled in another portion of the manufacturing process of the information handling system; and
   in response to the error not being handled in another portion of the manufacturing process, adding, by the processor, the error to the error log;

in response to the error being handled in another portion of the manufacturing process, determining, by the processor, whether the error file is completely processed;
    in response to the error file being completely processed, determining, by the processor, whether the error log is empty; and
    in response to the error log being empty, sending, by the processor, the validation process pass indication, otherwise sending, by the processor, a validation process fail indication.

7. The method of claim 6, wherein the validation process error file is created during an execution of the validation process.

8. The method of claim 6, further comprising:
retrieving a model name of the information handling system; and
reading the exemption list prior to determining whether the validation process error file is empty.

9. The method of claim 6, wherein sending the validation process pass indication comprises:
lighting a screen a first color.

10. The method of claim 9, wherein sending the validation process fail indication comprises:
lighting the screen a second color different than the first color.

11. A method comprising:
determining, at a server, whether skip conditions exist for a validation process during a manufacturing process of an information handling system;
in response to skip conditions not existing for the validation process:
  sending a script and an exemption list for the validation process from the server to the information handling system;
  determining whether a validation process error file is empty;
  in response to the validation process error file being empty, sending a validation process pass indication from the information handling system to the server;
  in response to the validation process error file not being empty, performing, by the information handling system, steps of:
  reading a line of the validation process error file;
  determining whether an error on the line of the validation process error file and a model number of an information handling system are found in the exemption list;
  in response the error and the model number not being found in the exemption list, adding the error to an error log;
  otherwise determining whether the error is handled in another portion of the manufacturing process of the information handling system;
  in response to the error not being handled in another portion of the manufacturing process, adding the error to the error log;
  in response to the error being handled in another portion of the manufacturing process, determining whether the error file is completely processed;
    in response to the error file being completely processed, determining whether the error log is empty; and
    in response to the error log being empty, sending the validation process pass indication from the information handling system to the server, otherwise sending a validation process fail indication from the information handling system to the server.

12. The method of claim 11, wherein the script and the exemption list are not sent in response to the skip conditions existing.

13. The method of claim 11, wherein the validation process error file is created during an execution of the validation process.

14. The method of claim 11, further comprising:
retrieving a model name of the information handling system; and
reading the exemption list prior to determining whether the validation process error file is empty.

15. The method of claim 11, wherein sending the validation process pass indication comprises:
lighting a screen a first color.

16. The method of claim 15, wherein sending the validation process fail indication comprises:
lighting the screen a second color different than the first color.

\* \* \* \* \*